Oct. 15, 1963   A. S. DENHOLM   3,107,326
VARIABLE CAPACITANCE ELECTROSTATIC GENERATOR
Filed May 25, 1960   2 Sheets-Sheet 1

OUTPUT POWER RELATIVE TO
OUTPUT VOLTAGE ($V_1$ CONST, $C_a = 0$)

OUTPUT POWER RELATIVE TO INPUT VOLTAGE ($V_2$ CONST, $C_a = 0$)

TO SCALE ASSUMING:
$C_o = 0.25\, cm$, $C_a = 0$, $V_1 = \frac{C_m + C_o}{2c_m} V_2$
AND UNIT ENERGY $= \frac{1}{2} C_m V_2^2$

WORK DONE BY C
E.S. ENERGY TO C
ENERGY ABSORBED (SUPPLY)
ENERGY ABSORBED (LOAD)

United States Patent Office 3,107,326
Patented Oct. 15, 1963

3,107,326
VARIABLE CAPACITANCE ELECTROSTATIC
GENERATOR
Alec S. Denholm, Burlington, Mass., assignor to High
Voltage Engineering Corporation, Burlington, Mass.,
a corporation of Massachusetts
Filed May 25, 1960, Ser. No. 31,737
4 Claims. (Cl. 322—2)

This invention relates to electrostatic generators and in particular to novel means for the generation of electric power by virtue of varying capacitance.

Rotating machines which generate power electrostatically hold promise of high power to weight ratios, particularly when operated with vacuum as the dielectric. Further, they can be highly efficient and may be constructed of materials which are not significantly affected by high temperatures. These features make them of interest as power sources for space applications, in particular for energising ion or charged particle thrust devices, since the machines generate power at high voltages.

Rotating electrostatic machines may be classed under two main headings—those which function by the transport of charge physically from one electrode to another (the carrier having to do mechanical work), and those which operate by virtue of capacitance variations. In a vacuum insulated machine, the first form would seem to involve at least two sets of brushes, which are undesirable for reliable operation over long periods without maintenance, for example, on a lengthy space flight. This effect is of particular importance in vacuum where brush wear may be severe. This invention relates to machines of the second type (variable capacitance) which hold promise of brushless operation.

Broadly stated, the invention comprises an improvement in a variable capacitance electrostatic generator of the type disclosed, for example, in U.S. Patent No. 2,194,839 to Van de Graaff and Trump. Referring to FIGURE 1 of said patent, in accordance with the invention the potential source indicated diagrammatically at 31 is eliminated so that the rotary hub 21 is grounded. In lieu of applying this exciting potential to the rotary hub 21, the point 57 is no longer grounded, but, in accordance with the invention, the point 57 is maintained at a potential of the same polarity as but less than that of the output voltage by means of an appropriate exciter potential which, in principle, might comprise a potential divider connected between the output 73 and ground. The invention may also be described with reference to the circuit diagram of FIGURE 3 of said Patent No. 2,194,839 in the following manner: the cathode of the rectifier 43 is connected not to ground but to some point along the resistor $R_L$, or to some other appropriate exciter potential, and the power supply 31 is eliminated. Although particular reference is made in this specification to rectifiers of the thermionic type having an anode and a cathode, it will of course be understood that any type of rectifier may be used in carrying out the invention, including solid-state rectifiers having a low-impedance and corresponding to the anode of a thermionic rectifier. As a result of this modification in accordance with the invention no brush is needed since the rotor is grounded; the output voltage is the same as the voltage across the rotor/stator gap; and the machine may in principle be made self-excited. In lieu of self-excitation, a suitable source of excitation power would be an electrostatic generator of the type shown in said U.S. Patent No. 2,194,839 which could be on the same shaft and so integrated with the generator here described.

The output voltage of the device shown in said Patent No. 2,194,839 and of the invention here described is determined by the voltage which can be applied across the rotor to stator gap. However, with the present invention the output voltage is equal to that which can be understood by the rotor/stator gap whereas the output voltage with the device described in Patent No. 2,194,839 is only equal to approximately half that which can be withstood by the rotor/stator gap. The mechanical energy transferred to electrical energy in both machines is determined by the change of capacitance which can be obtained in the machine which falls as the rotor to stator gap is increased. This, together with the fact that vacuum gap insulation strength increases much less than linearly with gap distance above about 1 mm.[1] limits the maximum rotor/stator gap which can be used with either the present invention or that described in Patent No. 2,194,839 to give an effective machine. This gives an advantage in output voltage to the present machine over that described in Patent No. 2,194,839 of 2:1. Conceptually, of course, both types of machine can be built with separate stages which can operate in series to give higher output voltages at the expense of simplicity. The modification in the prior art device which the invention makes does not change the power-to-weight ratio, so that, assuming that a ten pound machine will give roughly ten kilowatts and that the machines involved are ten pound machines, each machine will give ten kilowatts over and above the electrical input to it. Consequently the total output of the combination suggested above would be twenty kilowatts at say fifty kilovolts; and although the first stage of the combination (probably a 25-kilovolt machine) would have to have its own excitation voltage applied to its rotor as indicated in said U.S. Patent No. 2,194,839, this excitation voltage would be relatively low, and the high-voltage second stage of the combination, which is where insulation problems are greatest, could have a grounded rotor: this is an important feature of the invention.

The basic principles involved in the transfer of energy between mechanical and electrical systems by varying capacitance are as follows: Instantaneously, the charge (9) on the plates of a capacitor is equal to the product of the voltage ($e$) across the capacitor and its capacitance ($c$), which is given by the physical configuration, so that the current ($i$) is given by the equation:

$$i = \frac{dq}{dt} = c\frac{de}{dt} + e\frac{dc}{dt} \quad (1)$$

The instantaneous power into the capacitor, represented by the positive current in the circuit which enters the positive plate of the capacitor, is $$ei = ec\frac{de}{dt} + e^2\frac{dc}{dt} \quad (2)$$

The time rate of change of the energy $u$ in the electrostatic field of the capacitor is given by the equation:

$$\frac{du}{dt} = ce\frac{de}{dt} + \frac{1}{2}e^2\frac{dc}{dt} \quad (3)$$

In the capacitance system, by the law of conservation of energy, the electrical power into the capacitor must equal the sum of the rate of change of electrostatic energy in the capacitor field plus the mechanical power absorbed by the system moving the electrodes (i.e. varying the capacitance). Therefore the mechanical power P absorbed by moving system is the electrical power $ei$ of equation 2 minus the time rate of change of the energy $u$ of Equation 3, or $$P = \frac{e^2 dc}{2 dt} \quad (4)$$

P represents the rate of transfer of energy from the elec-

---
[1] Denholm, A.S., Can. J. Phys. 36, p. 476 (1958).

trical to the mechanical system. If P is negative (decreasing capacitance) mechanical work is done on the capacitor and electrical energy is supplied to the circuit. The mechanical energy W absorbed by the system moving the capacitor plates in period $t_1$ to $t_2$ is $$\frac{1}{2}\int_{C_1}^{C_2} e^2 dc \qquad (5)$$

where $C_1$, $C_2$ are the capacitance values at $t_1$, $t_2$, respectively. The charge flow in period $t_1$ to $t_2$ is $$i = \int_{e_1}^{e_2} c\,de + \int_{C_1}^{C_2} e\,dc \qquad (6)$$

The invention may best be understood from the following detailed description thereof, having reference to the accompanying drawings, in which FIG. 1 is a somewhat diagrammatic plan view of an electrostatic generator embodying the invention;

Figure 1:
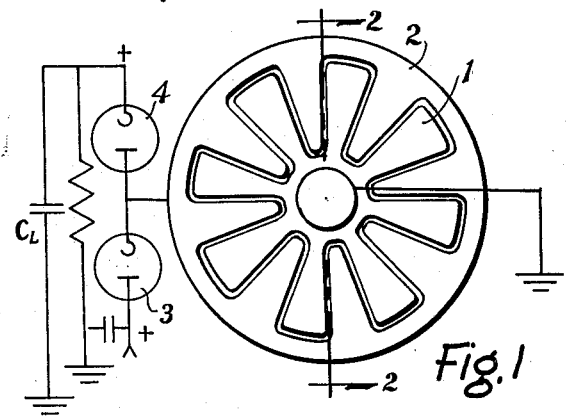
Figure 2:
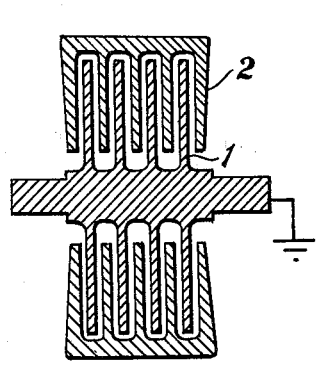
FIG. 2 is a sectional view along the line 2—2 of FIG. 1.

Referring to the drawings, and first to FIGS. 1 and 2 thereof, the multipolar generator therein shown comprises interleaving rotor members 1 and stator members 2 which are of metal and so arranged that with rotation of the rotor 1 the capacitance between them varies cyclically between a minimum value $C_0$ and a maximum value $C_m$. The rotor 1 is grounded and the stator 2 is connected to the junction of two rectifiers 3, 4 which are connected in series between a source 5 of excitation voltage $V_1$ and the load 6. The polarity of the excitation voltage $V_1$ is the same as that of the output voltage $V_2$, and the rectifiers 3, 4 are oriented to permit current flow of the desired polarity from the excitation source 5 to the load 6.

Figure 3:
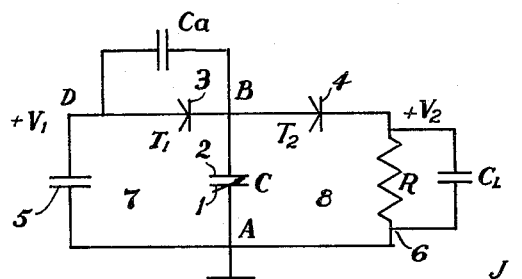
FIG. 3 is a circuit diagram of the apparatus of FIGS. 1–2.

The circuit of the generator of FIGS. 1 and 2 is shown in FIG. 3. Referring to FIG. 3, the variable capacitance (C) is that between the rotor 1 and the stator 2 and it has limits which are designated $C_m$ (maximum) and $C_0$ (minimum). $C_a$ is an auxiliary capacitance which assists in the development of the theory, but may only be the self capacitance of the valve 3. It is assumed that the inducing voltage ($V_1$) and output voltage ($V_2$) are constant and positive and that the potential drop across the rectifiers 3 and 4 is zero in the conducting state. In this machine, by the conservation of energy principle, the following relationship holds for any specific period: the sum of the work done by the variable capacitance C plus the change of electrostatic energy in the variable capacitance C plus the change of electrostatic energy in the auxiliary capacitance $C_a$ plus the energy absorbed by supply plus the energy absorbed by the load is equal to zero. It is obvious from the circuit that the stator plate 2 of the variable capacitance C cannot be more negative than $+V_1$ because of the rectifier 3. That is, the capacitor C is always positively charged. It can only be charged by current around the loop designated by the reference numeral 7 when $V_{BA}$ (the potential of point B relative to point A) equals $V_1$. It can only be discharged through $C_a$ or around the loop designated by the reference numeral 8 when $V_{BA}$ is greater than $V_1$. As capacitance C increases, it gains charge by flow around loop 7; rectifier 3 is conducting. At $C=C_m$ (time=0), $V_{BA}$ equals $V_1$ and $v_{DB}$ (the potential of point D relative to point B) is zero. As C starts to decrease neither rectifier 3 nor rectifier 4 conducts, and $$v_{BA} = V_1 - v_{DB} = V_1 - \frac{1}{C_a}\int_0^t i\,dt \qquad (7)$$

Figure 4:
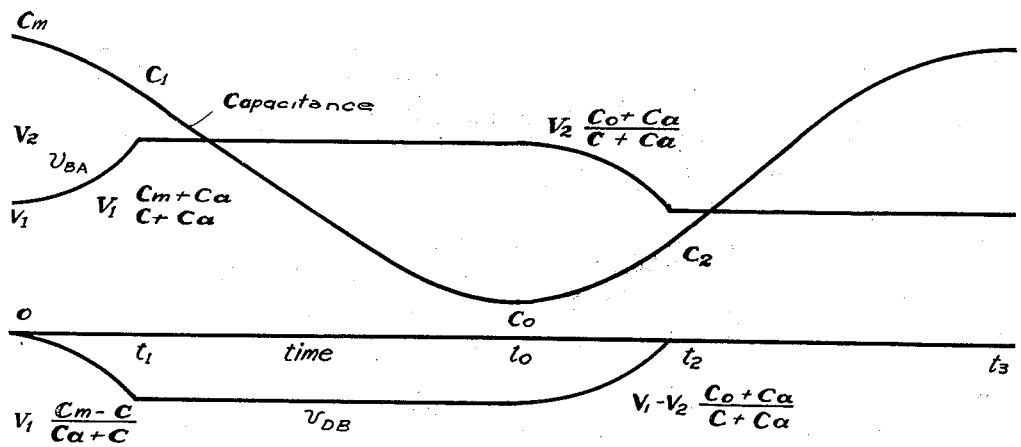
FIG. 4 is a graph showing variations in capacitance and voltage during the operating cycle of the apparatus of FIGS. 1–2.

It can be shown that $i$ is intrinsically negative. $v_{BA}$ becomes increasingly positive until $v_{BA} = +V_2$ when rectifier 4 starts to conduct. The period when $v_{BA}$ increases positively from $V_1$ to $V_2$ is designated phase A of the machine cycle in the graph of FIG. 4, which shows the variation of the capacitance C, the voltage $V_{BA}$ across it, and the voltage $V_{DB}$ across the rectifier 3 as a function of time. As the capacitance C continues to decrease below $C_1$ as shown on the graph of FIG. 4, rectifier 4 conducts until $C=C_0$. The part of the machine cycle between $C=C_1$ and $C=C_0$ is designated phase B in the graph of FIG. 4. As C increases past $C_0$, $v_{BA}$ falls below $V_2$ and while $V_1 < v_{BA} < V_2$ neither rectifier 3 nor rectifier 4 conducts. When $v_{BA}$ reaches $V_1$, rectifier 3 conducts at $C=C_2$ as shown on the graph of FIG. 4 and phase C of the cycle is complete, phase C being shown on the graph of FIG. 4 as the part of the machine cycle between $C=C_0$ and $C=C_2$. As capacitance C continues to increase beyond $C_2$, rectifier 3 conducts until $C=C_m$ at which point the cycle is completed. This is designated phase D of the cycle in the graph of FIG. 4.

Figure 6:
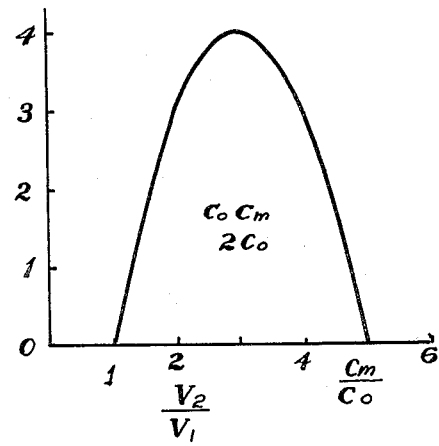
FIG. 6 is a graph showing the characteristic of the apparatus of FIGS. 1–2 at constant input voltage.
Figure 7:
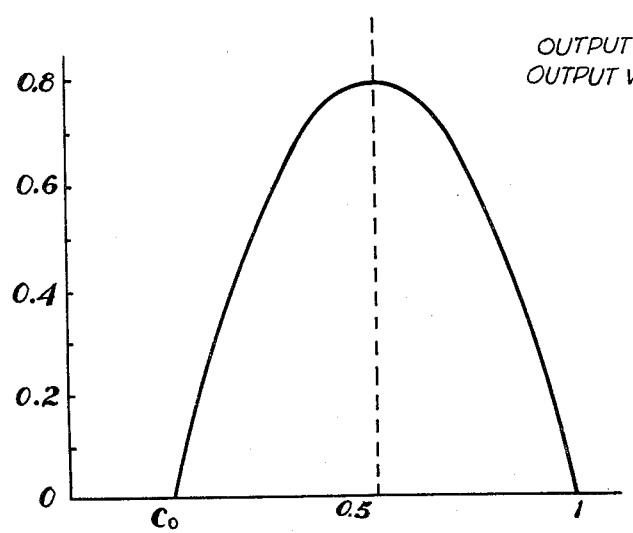
FIG. 7 is a graph showing the characteristic of the apparatus of FIGS. 1–2 at constant output voltage.
Figure 5:
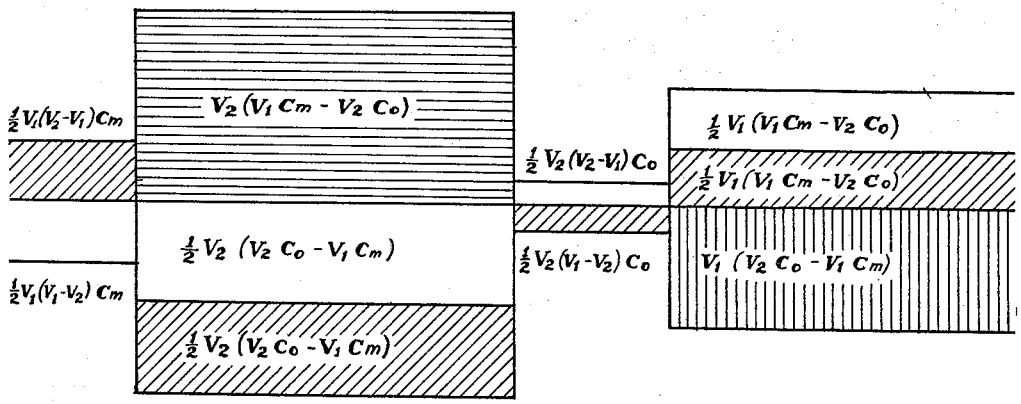
FIG. 5 is a graph showing energy changes during the operating cycle of the apparatus of FIGS. 1–2.

The energy balance for the complete cycle is shown in the graph of FIG. 5 and machine characteristics are shown in the graphs of FIGS. 6 and 7. It is apparent from the graph of FIG. 5 that the net electrical output J, or the sum of the energy absorbed by supply and load, is given by the expression:

$$J = -FV_1^2 - GV_2^2 + (F+G)V_1V_2$$

where $$F = C_m + C_a, \quad G = C_0 + C_a \qquad (8)$$

The maximum output energy per cycle $J_{max}$ is $$J_{max} = \frac{(F-G)^2}{4F} V_2^2 \qquad (9)$$

The output energy per cycle is therefore a maximum when $V_2$ is equal to the insulation strength of the rotor/stator gap. It is assumed that the load is a resistance (R) with a capacitance ($C_L$) across it which is sufficiently large to prevent significant ripples in $V_2$. In terms of output energy per cycle (power output$\div nP/60$). The output power characteristic at constant input voltage is shown on the graph of FIG. 6. It was assumed in drawing the output power characteristics of FIGS. 6 and 7 that $C_m = 5C_0$, $C_a = 0$; i.e., $F = C_0$, $G = C_0$. Similarly, the output power characteristic at constant output voltage ($V_2$) is shown on the graph FIG. 7.

The machine shown in FIGS. 1 and 2 requires supply energy at a voltage $V_1$ of the same order as the output voltage $V_2$. For a completely self-contained system which requires only shaft power, this machine needs either to be energized by another form of machine on the same shaft which is self contained or be capable of supplying its own input by feedback from its output. This machine is well suited to feedback excitation since the output polarity is in the same sense as the input polarity. The generator of the invention has a good power to mass ratio.

The machine of the invention has distinct advantages over that of Patent No. 2,194,839 for operation at the higher output volts (e.g. 50 kv.), but it does need a source of input power at a lower voltage. This source may be an electrostatic machine of the type shown in U.S. Patent No. 2,194,839 operating on the same shaft; the power concentration of the two machines together being essentially the same as one machine.

It will be understood that various modifications may be made in the embodiment of the invention described herein without departing from the spirit and scope of the invention. For example, while the invention has been described with reference to a stationary stator and rotating rotor, it is clear that the invention also comprehends similar apparatus in which the stator is rotated in a sense opposite to that in which the rotor is rotated. The speed at which the rotor can be rotated is limited by friction at the bearings and centrifugal forces impose a structural limitation on the speed which may be attained. Thus by using a counter rotating stator one can double the output otherwise obtainable. Moreover, the use of a counter rotating stator avoids gyroscopic effects which have been particularly adverse, for example, where the generator is to be used in a space vehicle.

Having thus described the principles of the invention together with an illustrative embodiment thereof, it is to be understood that although specific terms are employed they are used in a generic and descriptive sense and not for purposes of limitation, the scope of the invention being set forth in the following claims.

I claim:

1. An electrostatic generator comprising a stator element having a plurality of poles and consisting of a conductive structure, and a rotor element also having a plurality of poles and consisting also of a conductive structure, the poles of the rotor being closely spaced from and in interleaving relation to the poles of the stator and arranged to provide positions of maximum and minimum capacitance, a separate source of high unidirectional potential and first rectifier means connected in series between said stator element and said rotor element, said rectifier means being so oriented as to permit said stator to receive charge from said separate source, and a load and second rectifier means connected in series between said stator element and said rotor element and in parallel with said series-connected separate source and first rectifier means.

2. An electrostatic generator for generating high direct current potential, comprising a stationary and a rotatable element adapted alternately to assume positions of maximum and minimum capacitance, a separate source of high unidirectional potential and a load circuit connected in parallel between said stator element and said rotor element, and means for transferring charges unidirectionally from said separate source to the stationary element and from said stationary element to the higher potential side of the load circuit.

3. An electrostatic generator comprising relatively movable members adapted alternately to assume positions of maximum and minimum capacitance, a separate source of high-potential unidirectional power and a load circuit connected in parallel between said stator element and said rotor element, and means to charge the members unidirectionally from the separate source during one interval of the cycle of operation of the machine and to discharge members unidirectionally through the load during another interval of the cycle of operation of the machine.

4. An electrostatic generator comprising relatively rotatable members consisting each of a number of metallic segmented disks and adapted to interleave relative to one another so as alternately to assume positions of maximum and minimum capacitance, means (comprising a separate source of power) for continuously impressing a high unidirectional potential and a load circuit connected in parallel between said members, and means to charge the members unidirectionally from the separate source during period of increasing capacitance and to discharge the members unidirectionally through the load circuit during periods of lessening capacitance.

References Cited in the file of this patent

Publication: "The Review of Scientific Instruments," volume No. 11, issue No. 2, pp. 54–56, February 1940, by J. G. Trump et al.